United States Patent [19]

Hara et al.

[11] 4,310,091

[45] Jan. 12, 1982

[54] FILM-PACKET TO BE ADAPTABLE FOR PICTURE STAND

[75] Inventors: Yoshio Hara, Minami-ashigara; Tomoyuki Takahashi, Odawara; Yukihiro Sugimoto, Minami-ashigara, all of Japan

[73] Assignee: Fuji Photo Film Co., Ltd., Minami-ashigara, Japan

[21] Appl. No.: 102,519

[22] Filed: Dec. 11, 1979

[30] Foreign Application Priority Data

Dec. 11, 1978 [JP] Japan .............................. 53-170556[U]

[51] Int. Cl.³ ............................................. B65D 5/52
[52] U.S. Cl. .................................. 206/455; 40/152.1; 206/45.2; 206/45.24; 206/578
[58] Field of Search ..................... 206/455, 45.2, 45.24, 206/45.31, 578, 401, 395, 396, 409, 410, 44 B; 40/152.1, 155

[56] References Cited

U.S. PATENT DOCUMENTS

| | | | |
|---|---|---|---|
| T862,023 | 5/1969 | Daddis | 206/578 |
| 1,189,531 | 4/1916 | Bierwirth | 206/45.24 |
| 1,828,955 | 10/1931 | Bornmann | 206/389 |
| 3,602,371 | 8/1971 | Weiner | 206/45.24 |
| 3,922,700 | 11/1975 | Asano | 206/455 |
| 4,095,694 | 6/1978 | Jost | 206/455 |

FOREIGN PATENT DOCUMENTS

| | | | |
|---|---|---|---|
| 906924 | 8/1972 | Canada | 206/578 |
| 2614530 | 10/1977 | Fed. Rep. of Germany | 206/44 B |
| 1045282 | 6/1953 | France | 206/45.2 |

Primary Examiner—William Price
Attorney, Agent, or Firm—Sughrue, Mion, Zinn, Macpeak and Seas

[57] ABSTRACT

A film-packet for accommodating a predetermined number of film-units each to be used as an image carrying member for a camera based on the diffusion transfer process, which film-packet is provided with a recessed portion integrally formed on its rear side for seizing the end of a sheet-like article.

When all the film-units are used up, the box-like case of the film-packet may be utilized as a picture-holder of a picture-stand assembled, with a covering member of the film-units being seized by the recessed portion at its one end for functioning as a supporting leg of the picture stand.

4 Claims, 14 Drawing Figures

FILM-PACKET TO BE ADAPTABLE FOR PICTURE STAND

BACKGROUND OF THE INVENTION

This invention relates to a film-packet for accommodating film-units, each to be used as an image carrying member for a camera based on the diffusion transfer process and more particularly, to the film-packet of the above-described type which is further adaptable as a picture stand when all the film-units accommodated therein are used up.

As is shown in FIGS. 1 and 2, a film-packet 7 of the present invention may be formed in a box-like case 2 so that a predetermined number of film-units may be accommodated therein. The box-like case 2 is provided on its front side with a window-portion or frame 3 for exposure and a slit-shaped aperture 4, on its one lateral side relative to the front side, for permitting each film-unit 1 to be withdrawn therethrough. In the box-like case 2, the film-packet 7 is further provided with a covering member 6 for shielding the window-portion 3 therewith so as to prevent the film-units from being exposed and bears a backing plate 5 for causing the bundle of the film-units to be urged towards the covering member 6 through a resilient spring 5a.

Generally, when all the film-units accommodated are used up, there is no possibility of reusing of the film-packet per se, and the used film-packets have been discarded as of no value. In view of the manufacturing cost of respective film-packets, it seems quite unreasonable to discard the used film-packets as useless from an economical point of view. However, since the conventional film-packets are composed of a plurality of members each made from either of the plastic molding compounds, the metallic materials or the laminated composite materials, it is not practical to attempt to utilize these used film-packets to obtain reprocessed materials through a series of disassembling and reprocessing steps.

To make good use of the used film-packets, the present inventors found a fact that the used film-packet per se can be effectively utilized as a picture stand by adding some inventive steps to the conventional manufacturing mode of the film-packets.

SUMMARY OF THE INVENTION

Accordingly, an essential object of the present invention is to provide a film-packet which is adaptable as a picture stand.

Another important object of the present invention is to provide a film-packet of the above-described type, which can be manufactured without including any substantial additional cost when compared with the manufacturing costs of conventional film-packets.

A further object of the present invention is to provide a film-packet of the above-described type, which can be easily adapted to use as a picture stand only by the use of members constituting the film-packet.

In accomplishing these and other objects according to one preferred embodiment of the present invention, a conventional film-packet is further so arranged that a recessed portion capable of seizing one end portion of a sheet-like article therewith is integrally formed on a rear side face of the film-packet. In general, as is well known, the conventional film-packet for accommodating a fixed number of film-units each to be used as an image carrying member for a camera based on the diffusion transfer process comprises a box-like case for accommodating the film-units therein, a window-portion or frame for exposure constituting substantially the front portion of the box-like case, a slit-shaped aperture provided on a lateral side of the box-like case for permitting each of the film-units to be withdrawn therethrough, a covering member for shielding the window-portion therewith so as to prevent the film-units from being exposed and a backing member for causing the bundle of the film-units to be urged towards the covering member.

According the present invention, the box-like case is used as a picture-holder of a picture stand to be assembled, while the covering member is used as a supporting member for the picture holder. Therefore, one end portion of the covering member per se is seized by the recessed portion. However, the covering member adapted for the supporting member of the picture stand may be preferably cut or folded into appropriate dimensions when assembled, so that it may function as a stable leg-portion or a supporting member of the picture stand.

According to the present invention, in order to obtain a resultant covering member having easy cutting and/or folding characteristics, the characteristic properties of the molding plastics, i.e., the orientation of molecules and the weld-line, which are both predeterminedly effected during the manufacturing process of the injection-molded products subject to the manufacturing conditions, are effectively utilized.

As is seen from the description in the foregoing, according to the present invention, used film-packets which have been generally discarded as of no value can be again effectively utilized as practical picture stands.

BRIEF DESCRIPTION OF THE DRAWINGS

These and other objects and features of the present invention will become apparent from the following description taken in conjunction with the preferred embodiment thereof with reference to the accompanying drawings in which.

Before the description of the present invention proceeds, it is to be noted that like parts are designated by like reference numerals throughout several views of the accompanying drawings.

DETAILED DESCRIPTION OF THE INVENTION

Figure 1:
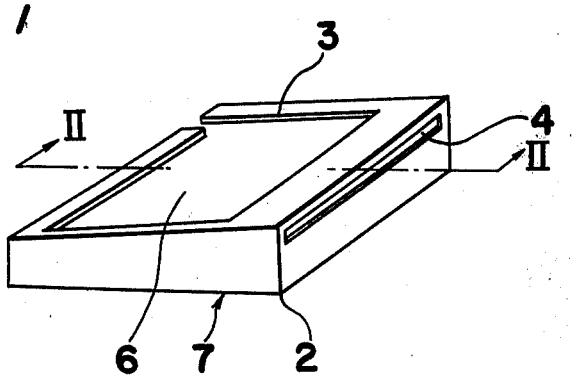
FIG. 1 is a perspective view showing a film-packet in conjunction with the present invention.
Figure 2:
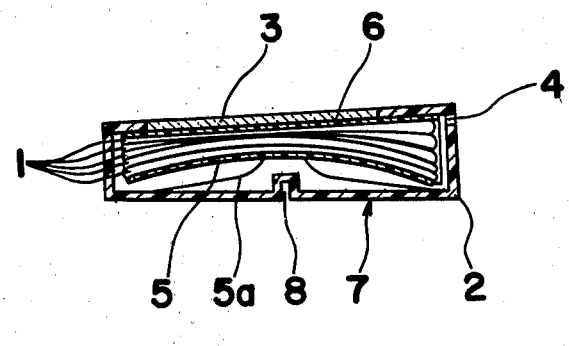
FIG. 2 is a cross sectional view taken along the line II—II of FIG. 1.
Figure 3:
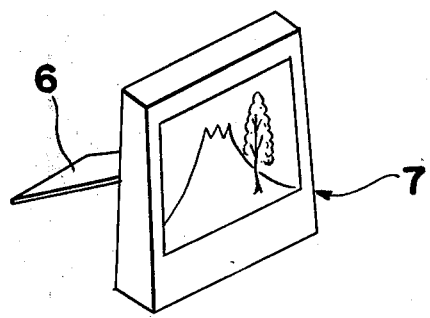
FIG. 3 is a perspective, schematic view of a picture stand according to the present invention.

Referring now to FIG. 3, there is shown a picture stand A according to the present invention. As is evident from this drawing, the used film-packet 7 can be converted into a picture stand only by providing it with a back support or a supporting member, whereby the used film-packet 7 per se can function as a picture holder and a covering member 6 may function as a leg-portion or back support of the picture stand. Furthermore, when a film-unit 1 carrying an image is again inserted into the picture holder of the picture stand as a picture to be displayed, the film-unit 1 can be easily inserted through a slit-shaped aperture 4, with an image carrying side of the film-unit facing window-portion 3 for exposure (see FIGS. 1 and 2). The above procedures do not involve any difficulties at all. With respect to the color of the film-packet 7, it is not critical, so long as the light can not be transmitted into the inside of the film-packet 7 through a box-like case 2. In view of a substantial usage of the film-packet 7, the color chosen can be naturally varied.

With respect to the leg portion, a covering member 6 for shielding the window-portion 3 therewith (see FIG. 2) should be adapted to take advantage of the used covering member, which will otherwise be discarded as of no value. Furthermore, such used covering member 6 may be cut or bent so that it may be of an appropriate size, when an outer appearance of the picture stand as a whole is taken into consideration.

With respect to a method for providing the film-packet 7 functioning as the picture holder with the leg portion, the introduction of the covering member whose portion is locally applied by a bonding agent or a double-coated tape with bonding agent may be considered. However, according to the method described above, another problem concerning additional cost inherent in introducing these agents is brought about when used film-packets are adapted for picture stands. Therefore, in order to overcome the undesirable problem described above, the present invention proposes methods which make the used film-packet to be again utilized as picture-stand without the inclusion of any substantially additional cost. In addition, the present methods further involve no difficulties at all, when the used film-packet is assembled into the picture-stand. According to the present methods, in the course of the manufacturing process of the film-packet 7 and the covering member 6, these are further so arranged in advance that these can be readily assembled into the picture stand of the present invention. The details are described in the following.

Figure 4:
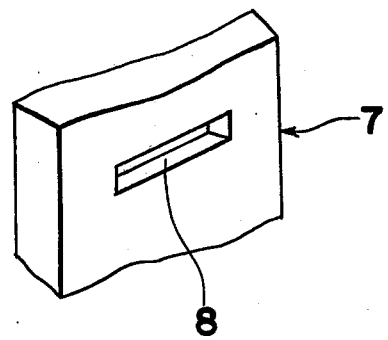
FIG. 4(a) is a perspective, partial view of the film-packet shown in FIG. 1, while particularly showing, on an enlarged scale, a recessed portion provided on a rear side of the film-packet.
FIG. 4(b) is a schematic, partial cross sectional view of the recessed portion shown in FIG. 4(a), while particularly showing a seizing relation effected between the recessed portion and a supporting leg.
FIGS. 4(c) and 4(d) are view similar to FIG. 4(b), while particularly showing respectively, substantially lateral seizing relations effected by a modified recessed portion of FIG. 4(a) and the supporting leg according to two modified embodiments of the present invention.
Figure 4:
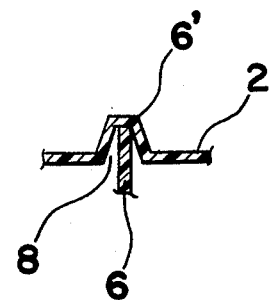
Figure 4:
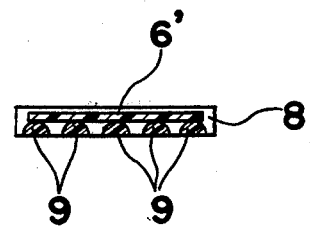
Figure 4:
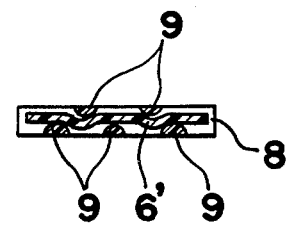

Referring now to FIGS. 4(a) and 4(b), the box-like case 2 is formed into such a configuration as that shown in FIG. 4(a) in the molding process of the box-like case 2, and provided with a recessed portion 8, which can receive one end portion of the leg portion with a substantially lateral engaging relationship being maintained, on the central portion of a rear side of the box-like case 2. Accordingly, the one end portion 6' of the covering member 6 which adapts as the leg portion is inserted into the recessed portion 8 and then fixed there. The location of the recessed portion 8 may be approximately centered on the rear side of the box-like case 2.

In order to provide the box-like case 2 with the recessed portion 8, the conventional constructional characteristics of the film-packet is taken into consideration. more specifically, in general, as can be seen in FIG. 2, a dead space usually prevails under the urging plate 5 inside the film-packet 7 with a substantially maximum height being effected in an approximate center of the lengthwise rear side of the box-like case 2, even when the predetermined number of the film-units remain unchanged. This is due to a fact that each film-unit 1 is arranged to include a pod-portion of an agent associated with the diffusion transfer process on a heading portion of the unit 1 and a space-portion in use for storing an excess amount of the agent on a trailing portion of the unit 1 under the urged backing condition as shown in FIG. 2. Such being the case, as is evident from FIG. 2, the maximum height of the space is effected in the manner as described above. Accordingly, the provision of an internal recessed portion does not affect the main function of the film-packet 7 at all, so long as the recessed portion 8 is properly centrally provided as described above.

According to the present invention, the configuration of the recessed portion 8 is modified as shown in FIGS. 4(c) or 4(d). In short, according to these modified embodiments, the width of a bottom-portion of the recessed portion 8 or the height of a bottom-section of the recessed portion 8 is arranged to be locally smaller relative to the thickness of the end portion 6' to be inserted, and the covering member 6 is therefore force inserted into the recessed portion 8. More specifically, in the embodiment shown in FIG. 4(c), the cross-sectional area of the recessed portion 8 is formed in a manner such that it becomes narrower in proportion to the depth of the recessed portion 8, while a lengthwise side-wall of the recessed portions 8 is provided with a plurality of ribs 9. The ribs 9 substantially laterally spaced with respect to each other on the side-wall and each rib has a semi-circular cross section. However, the cross sectional shape of the rib is not critical. The height of the entrance of the recessed portion 8, which is coplanar with the rear surface of the case 2, is arranged to be larger than the thickness of the end portion 6'. By the arrangement as described above, the end portion 6' can be easily inserted into the recessed portion 8, with the result that it is further frictionally seized by the recessed portion 8. In the embodiment shown in FIG. 4(d), there are provided a plurality of ribs 9 on both lengthwise side-walls of the recessed portion 8. As is clear from FIG. 4(d), the ribs 9 are provided on the respective walls in a manner such that respective, vertical distances to be relatively effected by the respective ribs on both sides are locally smaller than the thickness of the leg-portion 6'. However, not only respective numbers of the ribs on both sides, but also the cross-sectional shapes of these ribs on both sides are not critical. According to the embodiment described above, the end portion 6' is forcibly inserted into the recessed portion 8, while it is deformed so as to fit for the specifically arranged recessed portion 8.

To integrally form the recessed portion 8 on the rear face of the film-packet 7 may be accomplished by conventional injection molding without difficulty, whereby the cost and procedures are not substantially different from the injection molding of the conventional film-packets.

As described previously, the covering member 6 to be adapted for the leg-portion or the supporting portion is preferably cut or folded into appropriate dimensions when assembled, so that it may function as a stable leg-portion of the picture stand.

Figure 5:
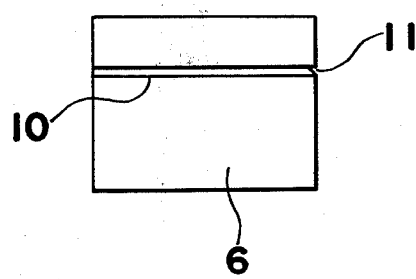
FIG. 5(a) is a front, elevational view of a covering member included in the film-packet shown in FIG. 2 according to the present invention.
FIG. 5(b) is a side, elevational view of the covering member shown in FIG. 5(a)
Figure 5:
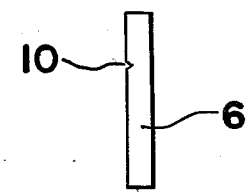

The covering member 6 of one of the plastics is manufactured by a conventional process of injection molding. In order to obtain the covering member having 20 easy cutting and/or folding characteristics, the properties of the molding plastics, i.e., the orientation of molecules and the weld-line, which are both predeterminedly effected during the manufacturing process of the injection-molded products subject to the manufacturing conditions, may be effectively utilized. When these phenomenological characteristics inherent in the process of the injection molding are taken into account, it is not difficult at all to obtain the resultant injection-molded product, which can be easily changed into the leg portion having the predetermined shape through manual cutting and/or manual folding. Furthermore, in order to ensure the resultant injection-molded products being cut off by at predetermined length, there can be employed such type of injection mold which can further effect a V-shaped cut-out groove on the resultant injection-molded product. The resultant covering member 6 having the V-shaped cut-out groove 10 is shown in FIGS. 5(a) and 5(b). Furthermore, for the sake of handy cutting operation, in addition to the V-shaped groove 10, the covering member 6 is further arranged to have a cut-out 11 at one end of the V-shaped cut-out groove 10. As long as the covering member 6 is made of one of plastics, plastics composites and papers, a cutting operation is preferable to shape the covering member 6 into the leg portion having the predetermined dimensions. However, when the covering member 6 is made of one of metallic materials, folding lines are preferably printed on the covering member so that it may be shaped into the predetermined dimensions by the use of the printed folding lines.

Figure 6A:
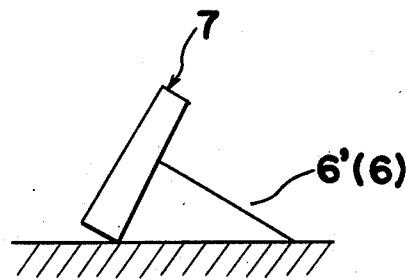
FIG. 6(a) is a schematic, side view of the picture stand shown in FIG. 3.
Figure 6B:
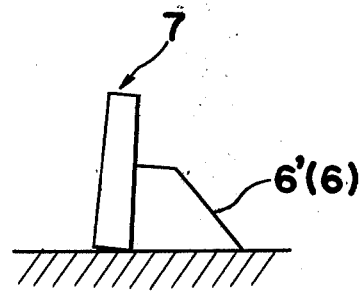
FIG. 6(b) is a view similar to FIG. 6(a), while particularly showing a modified embodiment of the picture stand shown in FIG. 6(a) according to the present invention.
Figure 6C:
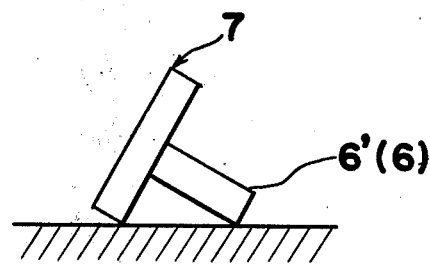
FIG. 6(c) is a view similar to FIG. 6(a), but particularly showing a resetting state of the picture to that shown in FIG. 6(a) by turning the picture stand around by 90 degrees.

Referring now to FIGS. 6(a) to 6(c), there are shown three assembled embodiments of the picture stand according to the present invention. In FIG. 6(a), there is shown the embodiment wherein the covering member 6, which has been already converted into the leg portion, is simply inserted into the recessed portion provided on the film-packet 7 at its one end portion 6' and is fixed in the recessed portion. However, as is shown in FIG. 6(b), from a standpoint of an aesthetic, outer appearance of the picture stand, the leg portion is folded at an appropriate, longitudinal point so as to cause it to take the reverse L-shaped form. Such being the case, if the covering member 6 is the injection-molded product of one of the plastics and is manufactured by taking into consideration of the orientation of molecules of the product in advance, the covering member 6 may be provided with the characteristics wherein the product can be only folded in a direction opposite to the direction for splitting. By taking advantage of the characteristic property described above, the leg portion can be easily folded at its predetermined longitudinal point.

As a matter of fact, depending upon the dimensions of the picture to be displayed, the picture stand may be reset in the state shown in FIG. 6(c) only by turning the picture stand around by 90 degrees with respect to the state shown in FIG. 6(a). The picture stand set in the state as shown in FIG. 6(c) stands under stable conditions.

Figure 7A:
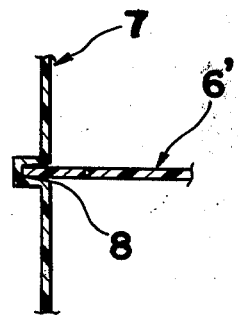
FIGS. 7(a) and 7(b) are views similar to FIG. 4(b), but particularly showing respective modified embodiments of the recessed portion shown in FIG. 4(b) according to the present invention.
Figure 7B:
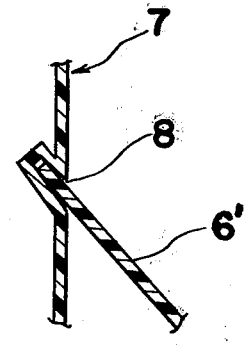

Furthermore, from a standpoint of favorable external appearance of the picture stand, the recessed portion 8 may be provided on the rear face of the film-packet 7 in a manner such that it is substantially upwardly slanted towards the innermost side of the recessed portion 8 as shown in FIGS. 7(a) and 7(b). By the arrangement as described above, the embodiments shown in FIGS. 7(a) and 7(b) bring about the same effectiveness as that to be effected by the embodiment having the folded leg portion as shown in FIG. 6(b).

As is clear from the description in the foregoing, according to the present invention, there is provided the film-packet, wherein the recessed portion capable of frictionally seizing one end portion of the leg-portion of the picture stand is integrally formed in the manufacturing process of the film-packet. By the arrangement above, when all the film-units are used up, the box-like case may be utilized as the picture holder, while the covering member is adapted as the leg portion to be inserted into the recessed portion at its one end. Accordingly, when these are assembled in one unit, the picture stand may be formed as desired. Accordingly, used film-packets which have been generally discarded as of no value can again be effectively utilized as the picture stands.

Furthermore, according to the present invention, the additional costs inherently required for manufacturing such film-packets as described above or the covering members each having the V-shaped groove are negligibly small, since the respective injection molds for them and the like require only a slight alteration for the purpose described above.

Although the present invention has been fully described by way of example with reference to the accompanying drawings, it is to be noted here that various changes and modifications are apparent to those skilled in the art. Therefore, unless otherwise such changes and modifications depart from the scope of the present invention, they should be construed as included therein.

What is claimed is:

1. A film-packet adaptable for a picture stand, said film-packet accommodating a predetermined number of film-units, each to be used as an image carrying member for a camera based on the diffusion transfer process, said film units including a pod-portion for an agent associated with the diffusion transfer process on a heading portion of the unit, and a space-portion in use for storing an excess amount of the agent on a trailing portion of the unit to opposite sides of the center of each unit, said film packet comprising:

a box-like case for accommodating said film-units therein, said box-like case having a front side, a rear side and opposed lateral sides, a window-portion within said front side defining a window for exposure and constituting a substantial portion of said front side of said box-like case, a slit-shaped aperture provided on one lateral side of said box-like case adjacent said window for permitting each of said film-units to be withdrawn therethrough, a sheet-like article covering member of a length and width closing off said window and slidably positioned between said film-units and said front wall for shielding said window so as to prevent said film-units from being exposed, and being slidably removable from said case through said slit, and a spring biased backing plate within said box-like case and between said rear wall and said film-units for causing said film-units to be urged towards said covering member, the improvement wherein said box-like case includes an integral recess within said rear wall projecting from said rear wall into the interior of said box-like case at an approximately central location and within a dead space intermediate of the film-unit pod-portions and said space portions and wherein one end of said covering member is dimensioned and configured so as to strongly frictionally fit in said rear wall recess after said covering member is removed from said case to function as a supporting leg to permit said film-packet box-like case and said covering member to constitute a picture stand for a developed film from one of said film-units.

2. A film-packet to be adaptable for a picture stand as claimed in claim 1, wherein the transverse width of said recessed portion at its bottom is locally smaller relative to the thickness of said one end portion of said covering member.

3. A film-packet to be adaptable for a picture stand as claimed in claim 2, wherein said recessed portion comprises laterally spaced lengthwise side-walls and a plurality of ribs are provided on at least one lengthwise side-wall of said recessed portion.

4. A film-packet to be adaptable for a picture stand as claimed in claim 1, wherein said recessed portion is provided with opposed walls which are bent towards each other toward the interior of said case.

* * * * *